Figure 1:
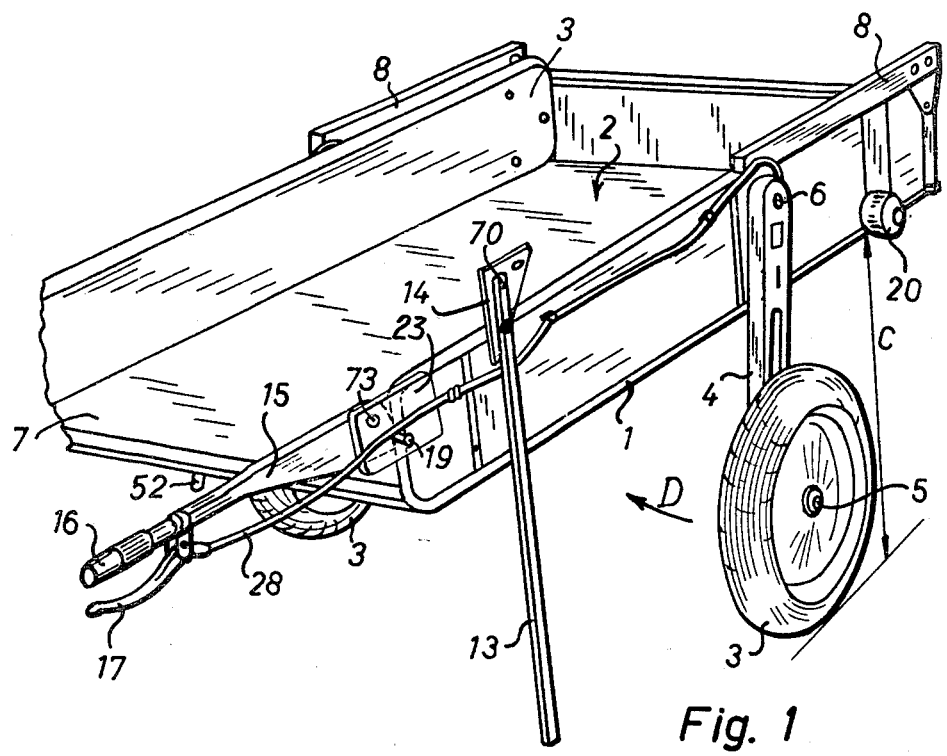

United States Patent [19]

Eicher

[11] 4,275,896
[45] Jun. 30, 1981

[54] SAFETY MECHANISM FOR A CARRIAGE INSERTABLE INTO THE LOAD SPACE OF A VEHICLE

[76] Inventor: Josef Eicher, Eichholz 1108, 9436 Balgach, Switzerland

[21] Appl. No.: 44,083

[22] Filed: May 31, 1979

Related U.S. Application Data

[63] Continuation-in-part of Ser. No. 838,446, Oct. 3, 1977, Pat. No. 4,170,379.

[30] Foreign Application Priority Data

Jul. 10, 1976 [CH] Switzerland .................. 12738/76

[51] Int. Cl.³ ............................................. B62D 21/00
[52] U.S. Cl. .................................. 280/43.1; 280/645; 280/43.24; 280/655; 296/20
[58] Field of Search .................. 296/20; 280/645, 652, 280/43.1, 43.24

[56] References Cited

U.S. PATENT DOCUMENTS

| 2,877,047 | 3/1959 | Weil | 296/20 |
| 3,082,016 | 3/1963 | Pratt | 296/20 |
| 3,403,923 | 10/1968 | Mouchet | 280/43.1 |
| 3,741,586 | 6/1973 | Wiczer | 280/652 |

Primary Examiner—Robert R. Song
Attorney, Agent, or Firm—W. G. Fasse; D. F. Gould

[57] ABSTRACT

The present safety mechanism is especially constructed for a carriage insertable into a load space of a vehicle. The safety device prevents the accidental unlocking of wheel supporting, tiltable arms of the carriage. Specifically, the wheel supporting arms must not be able to tilt upwardly unintentionally. For this purpose a security pin or bolt is provided which is capable of reaching behind a shoulder of a locking bolt. The security pin or bolt is connected by a cable to a tiltable lever which supports a roller. When the roller comes to rest on a support, for example, the loading platform, the security pin or bolt is withdrawn from the shoulder arresting position so that only after such withdrawal the locking bolt may be disengaged by actuating a respective grip member at the handle of the carriage.

6 Claims, 4 Drawing Figures

SAFETY MECHANISM FOR A CARRIAGE INSERTABLE INTO THE LOAD SPACE OF A VEHICLE

CROSS REFERENCE TO RELATED APPLICATIONS

The present application is a continuation-in-part application of my copending application U.S. Ser. No. 838,446, filed: Oct. 3, 1977, now U.S. Pat. No. 4,170,379, issued on Oct. 9, 1979.

BACKGROUND OF THE INVENTION

The invention relates to a safety mechanism for a carriage insertable into the load space of a vehicle. Such a carriage or cart, usually comprises two tiltable arms each having a wheel secured to the free end thereof. The wheel carrying arms are secured to a frame supporting a loading platform. The wheel supporting arms are tiltable about a generally horizontal, rotational axis disposed at a respective outer side of the frame. At least one roller is secured at the front portion of the vehicle to project below the loading platform. Locking means are provided for locking the arms in their lowered position. The locking means release the arms for an upward tilting when the carriage is not loaded.

The above described carriage has found widespread acceptance since it is well adapted for insertion into the loading space of a vehicle, for example a station wagon, thereby greatly facilitating the loading and unloading of goods, especially when such goods are relatively heavy or when the goods must be transported to a location which cannot normally be reached by the car itself.

However, there is room for improvement, especially with regard to the locking mechanism which is intended to hold the carriage leg supporting arms in a locked position when the carriage is loaded and not yet inserted into the load space of a vehicle.

OBJECTS OF THE INVENTION

In view of the above it is the aim of the invention to achieve the following objects singly or in combination:

to provide a safety mechanism for the type of carriage just described which will prevent the wheel supporting arm from being unlocked unintentionally;

to construct the locking mechanism in such a manner that a security pin which locks an arresting bolt, may be withdrawn only in response to a predetermined condition; and to construct the locking mechanism in such a manner that it may be installed without any difficulties, particularly in carriages of the type described above.

SUMMARY OF THE INVENTION

According to the invention there is provided a safety mechanism which is characterized in that the arresting means for the arms which support the wheels when the arms are in the lowered down position, include a security pin which secures the respective arresting bolt against withdrawal when the wheels are in their operating positions. The security pin cooperates with roller means which are movably supported ahead of the wheel supporting arms as viewed in the direction in which the carriage is moved into a vehicle. Said cooperation is such that the security bolt can be withdrawn into an unlocking position only when the rollers rest on a supporting surface.

The just described structure assures that the tiltable arms which carry the wheels can be unlocked only when the carriage is supported at least at the portion thereof away from the carriage handles, in other words, when the carriage end, opposite the handles, already rests on the loading floor of the vehicle.

BRIEF FIGURE DESCRIPTION

Figure 2:
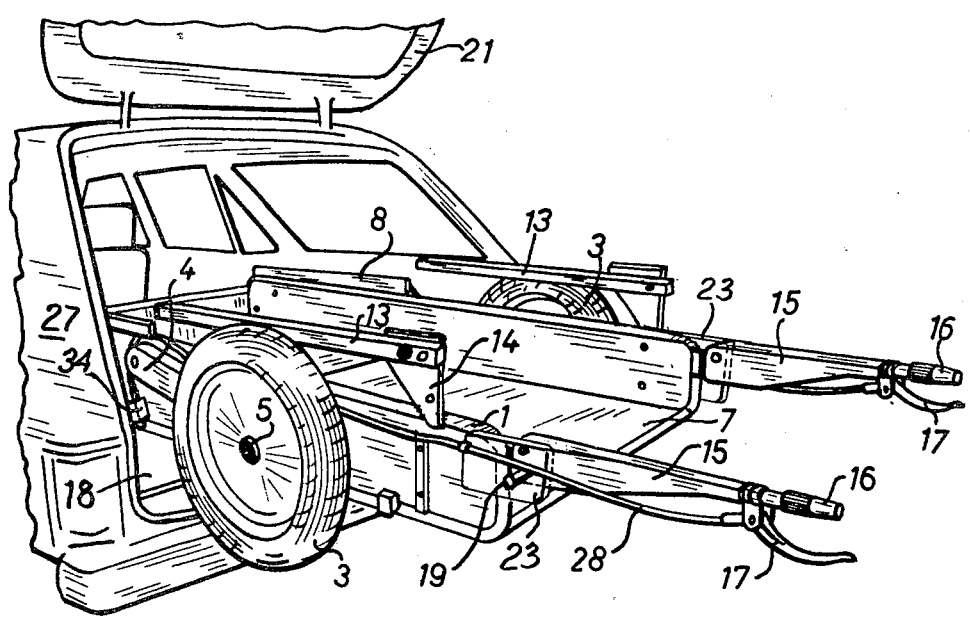
Figure 3:
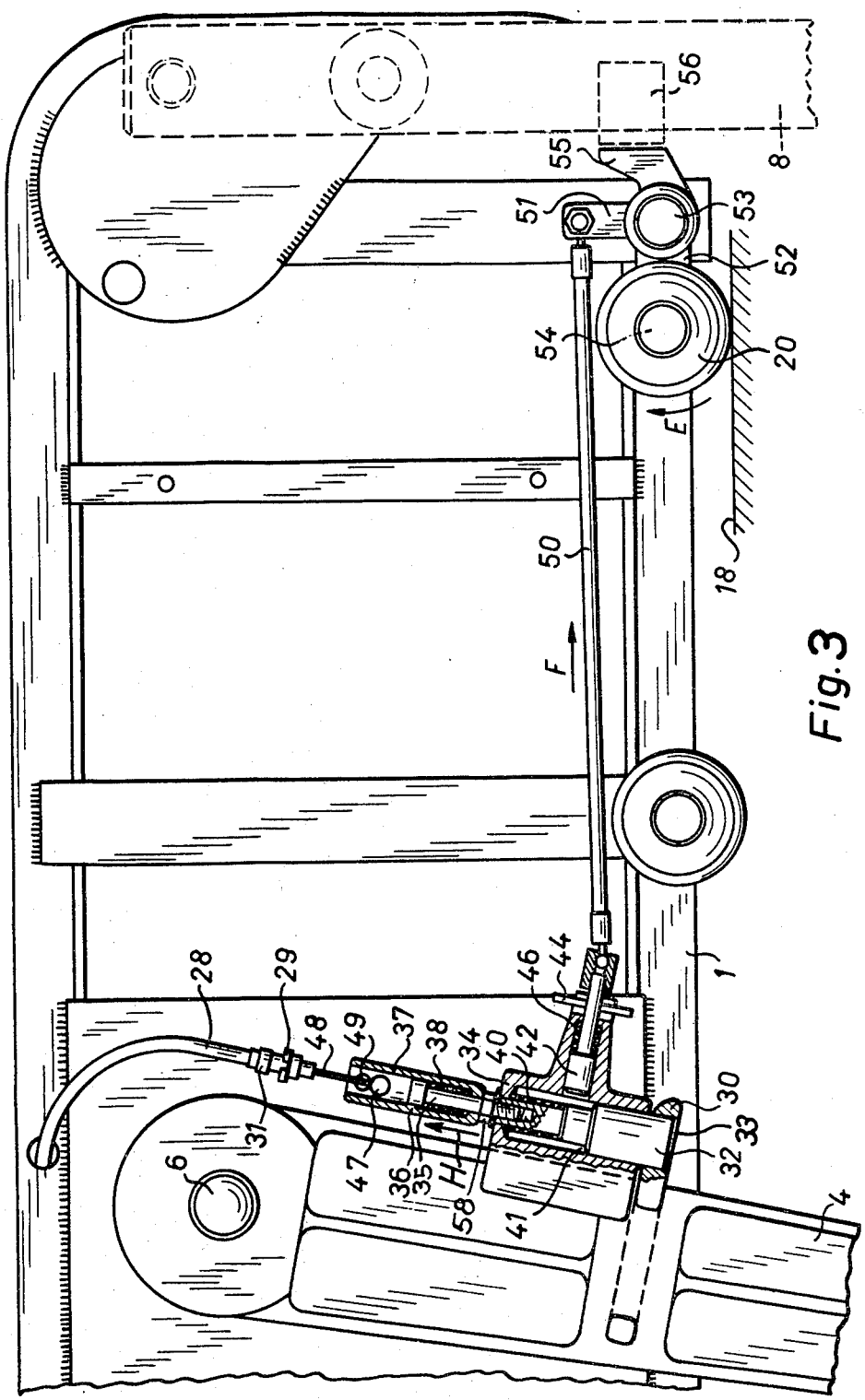
Figure 4:
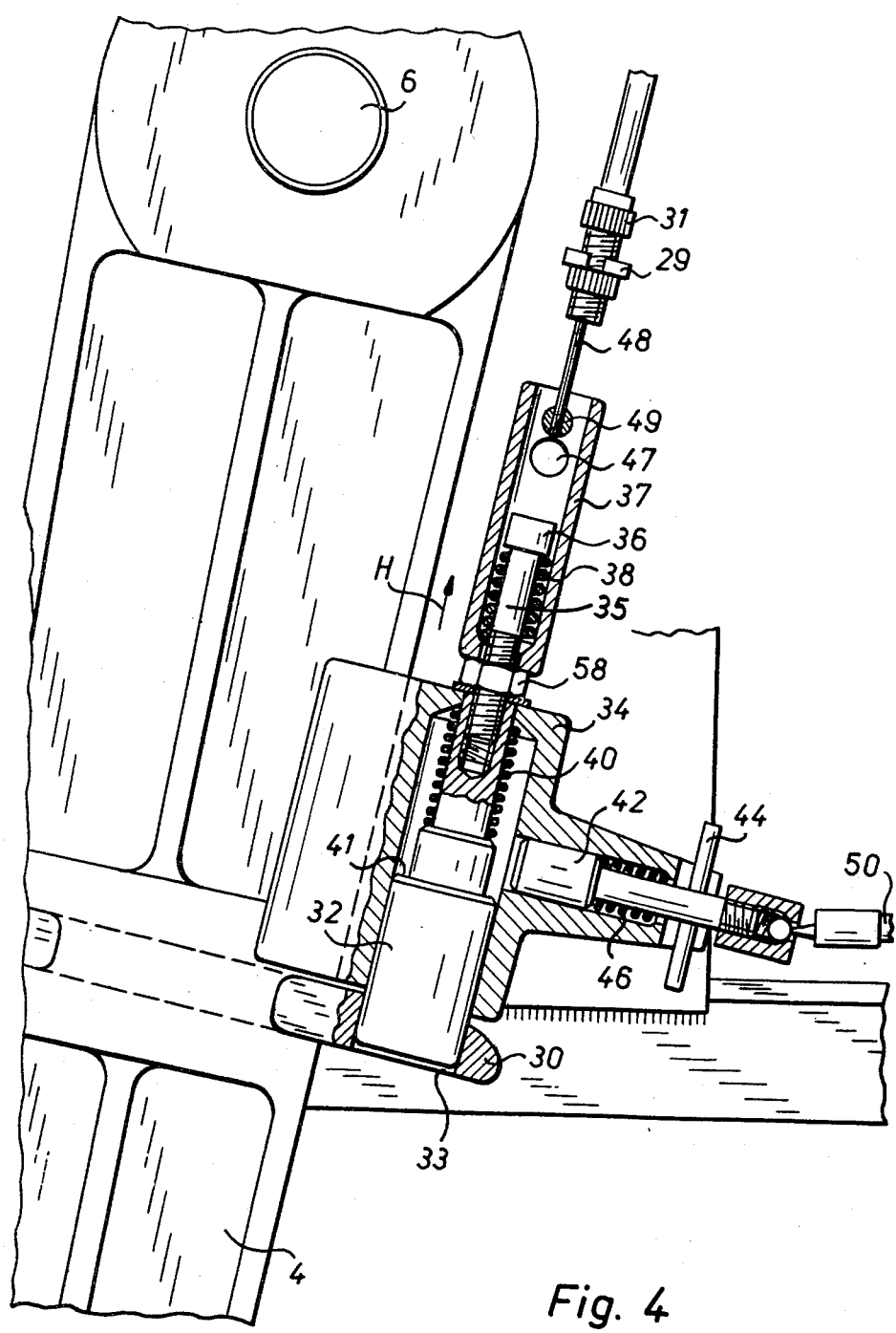

In order that the invention may be clearly understood, it will now be described, by way of example, with reference to the accompanying drawings, wherein:

FIG. 1 is a perspective partial view of a carriage in the condition in which the wheels are lowered so that the carriage may be used as a push cart or pull cart;

FIG. 2 is a perspective view of the carriage in a condition ready for insertion into the load space of a car such as a station wagon; and FIG. 3 illustrates the improved locking mechanism according to the invention partially in section with roller 20 resting on the floor 18 and the security pin 42 disengaged. Supports 8 are shown in phantom in the alternative locking position; and FIG. 4 is a detailed view in partial cross-section of the improved locking mechanism shown in FIG. 3.

DETAILED DESCRIPTION OF PREFERRED EXAMPLE EMBODIMENTS AND OF THE BEST MODE OF THE PRESENT INVENTION

The vehicle according to FIG. 1 is designed for accommodating goods to be transported and may be pushed together with such goods into the rearwardly opening luggage or load space of a motor vehicle 27, for instance, a station wagon. Additionally, this vehicle may also be used as a two-wheeled cart for short stretches of road transport.

The vehicle has a frame 1 made of sectioned rails or of pipes to form a loading base or platform 2, U-shaped in cross-section, and provided with wooden planking 3 or the like. This loading platform 2 serves for receiving goods to be transported. In the middle third of the length of the vehicle a respective arm 4 is pivotably secured on trunnions 6 on the outside of the frame. A wheel 3 is secured to the lower end of each arm so that the wheel can rotate about a horizontal wheel axle 5. This wheel axle extends outwardly relative to the arm so that the arms 4 together with the wheels can be swung upwardly and rearwardly in the direction of the arrow D above the floor 7 of the loading platform 2. The distance C from the floor of the loading platform to the ground is greater than ⅓ of the width of the loading platform and amounts to at least 30 cm, preferably about 40–55 cm. The diameter of the wheels 3, provided with pneumatic tires, is preferably greater than half the distance C.

As can be seen from FIG. 2 both arms may be swung upwardly together with the wheels 3 when it is desired to push the vehicle into the loading space of a motor car. In the upwardly tilted position the wheels do not extend behind the vehicle.

When the arms 4 project downwardly they are secured in this position by arresting means which prevent any undesired pivotal movement of the arms 4 in the direction of the arrow D.

At the rear end of the frame 1 there are two pivotable handles in the form of struts 15 each of which may be fixed by means of a respective lug 19 in the positions shown in FIGS. 1 and 2. Each lug 19 rigidly engages a hole in a respective locking plate or gusset 23 which is gidly fixed to frame 1 in the conventional manner. Each handle strut 15 receives such plate or gusset 23 in slot and is pivotally coupled by pin 73. The lug 19 arrests pivotal motion in the conventional manner. At the outer end of each strut 15 there is a respective hand grip 16. The two struts 15, when not used, may be swung upwardly by more than 90° so that they extend somewhat parallel to the lowered rear door 21 of the motor car. The two struts could alternatively be constructed as telescoping struts.

At the rear part of the frame there are two pivotable supports 13 which may be locked in the lowered and generally vertical position and which are rotatable about a respective bearing plate 14 so that in the out-of-use position these supports 13 extend substantially in parallel to the top of the frame. In order to prevent inadvertent displacement of transport goods disposed in the loading platform, partititon walls, not shown in the drawing, could be provided on the loading platform.

Two additional pivotable supports 8 are provided at the front of the frame and may be locked in a vertical position. In the inoperative position these supports 8 are pivoted upwardly so that they lie somewhat in parallel to the upper surface of the frame. A flexible push-pull able having a cable jacket 28 and a cable core 48 is connected to each of the pivotable struts 15. Each cable ends in a handle 17 and may follow the movements of the struts 15.

At the front end of the frame or adjacent thereto there is a pair of rollers 20 secured to the frame 1. These rollers project somewhat under the floor 7 of the loading platform 2 so as to facilitate the pushing of the vehicle into the loading space of a car. It is also possible to provide only a single roller 20 at the center of the front of the frame for smaller loads or to arrange two roller pairs one behind the other in the front third of the frame when it is anticipated that the vehicle is intended for carrying particularly heavy loads.

In order to prevent inadvertent unlocking of the arms by the actuation of the handle means 16, 17 when there is a load on the loading platform 2 a security device is provided to permit pivoting of the arms 4 from the lowered position only when the wheels 3 are not, or substantially not, subject to a load. The security means are shown in FIGS. 3 and 4. The arms 4 are at a slightly inclined position of 10° to 15° to the vertical, in their lowered position. A member 30 provided with a bore 33 rigidly connected to each arm 4, the rigid connection being achieved by welded seams, for instance.

A respective housing 34 is rigidly connected with the frame 1 and functions as an abutment for the corresponding arm 4. A locking bolt 32 is supported for axial displacement in the interior of the housing 34 and engages in the locking position in the bore 33 of the member 30. A weak spring 40 urges the locking bolt 32 downwardly and thus into the locking position. A screw 35 or the like is set into the upper end of the locking bolt 32 and the head 36 of the screw 35 projects into and is axially displaceable in the interior of a sleeve 37. The screw 35 engages screw nut 58 and locking bolt 32. Between the head 36 of the screw and the lower end of the sleeve 37 there is a spring 38, the compression of which requires a greater force than that required for the spring 40. A cable core 48 has at one of its ends a thickened portion 47 and is connected with the sleeve 37 by means of a peg 49. The cable jacket 28 of the cable is held on the frame by a cable clip 29. The effective length of the cable core 48 may be altered by means of adjusting nuts 31.

The locking bolt 32 is provided with a shoulder 41 behind which a security pin 42 engages in the locking position, the locking pin 42 being biased by a spring 46. The outwardly projecting end of this pin 42 is pierced through by a cotter pin 44 which in the illustrated position is fitted into a slot in the housing 34. By manually lifting and turning this cotter pin 44 by e.g. 90° the security pin 42 is retracted from the path of movement of the locking bolt 32. The cable 28 and the cable core 48 extend to a respective grip member 17 at the outer end of the struts 15.

According to the invention the end of the security pin or bolt 42 which extends out of the housing 34 is connected to a pulling means such as a pulling cable 50. The other end of the cable 50 is secured to a lever arm 51 which cooperates with and is rigidly secured to a further tiltable lever 52. Thus, the levers 51 and 52 form a bell crank tiltable about a journal 53. The free end of the lever 52 away from the journal 53 carries a roller 20 which itself is rotatable on a journal 54. Thus, when the roller 20 contacts a surface such as the loading floor 18 of a vehicle, the lever 52 tilts upwardly and the lever 51 thus rotates clockwise in the direction of the arrow E until security pin 42 is pulled out of engagement with the shoulder 41 of locking bolt 32 as shown in FIGS. 3 and 4. In this position the core of the cable 50 is pulled in the direction of the arrow F thereby withdrawing the security pin 42 somewhat out of the housing 34 and thus out of the engagement with the locking bolt 32 thereby permitting the unlocking movement of the locking bolt 32 for moving the cart, for example, into a vehicle as shown in FIG. 2. Of course, the supports 8 shown in phantom lines in FIG. 3 would be tilted upwardly and pivoted around to rest out of the way on the frame 1 in the position shown in FIG. 2. On the other hand when the roller 20 does not rest on any supporting surface 18, and when the legs or supports 8 are in the downwardly directed support and locking position as shown in the dashed lines of FIG. 3, the security pin 42 engages a shoulder 41 of the locking bolt 32 so that the latter cannot be withdrawn from the member 30 even if the operating handles 17 should be actuated. Furthermore the securing pin 42 may not be withdrawn from engagement with the locking bolt 32 because of the safety features hereafter described.

Preferably a roller 20 and the respective safety components are provided on each side of the carriage for cooperation with the respective safety mechanism, especially the bolt 32.

The safety mechanism according to the invention operates as follows. When the arms 4 are lowered into the position shown in FIG. 3, the locking pin 32 snaps into the hole 33 of the locking bar or member 30. Thus, the arms 4 are locked against tilting. Let it be assumed that a load is present on the loading platform 2 which is thus supported by the arms 4 and the wheels 3. It is now necessary to prevent an erroneous or negligent actuation of the operating grips 17 from releasing the locking pin 32 whereby the arms 4 would be unlocked and could be tilted. The invention provides a double safety feature against this unintentional or negligent actuation of the operating handle 17. First, a safety feature is accomplished in that the force of the spring 38 is selected so that when a load is resting on arms 4 it cannot overcome the friction between the locking pin or piston 32 and the wall of hole 33 in member 30 and the interior of housing 34. Therefore, if the extended arms 4 are bearing a load, the sleeves 37 perform an idle stroke in the direction of the arrow H when the core 48 of the cable 28 is subjected to a pull exerted on the operating handle 17.

A further safety feature is achieved according to the invention in that the security pin 42 engages the shoulder 41 of the locking bolt 32 as long as the roller 20 does not tilt in the direction of the arrow E. Such tilting of the roller 20 takes place, however, only when the carriage is inserted into and rests on the loading floor or the like, that is, when the carriage rests on the roller 20.

As soon as the rollers 20 have been tilted in the direction of the arrow E the security pin 42 will take up the position shown in FIG. 3 in which it does not anymore engage the shoulder 41 of the locking bolt 32. In addition, in this position the friction in the the interior of housing 34 is smaller due to the load release from the arms 4 and the wheels 3. Thus, operation of the handle 17 will remove the locking bolt 32 from the hole 33 in the member 30.

Although the invention has been described with reference to specific example embodiments, it will be appreciated, that it is intended to cover all modifications and equivalents within the scope of the appended claims.

What is claimed is:

1. A safety mechanism for a carriage which is insertable into the load space of a vehicle, said carriage having arms (4) and wheels secured to said arms which are tiltable between operating and withdrawn positions, comprising arresting means (30, 32) operatively arranged for locking said arms in their operating position, and a safety device operatively arranged for cooperation with said arresting means to prevent the unlocking of said arms when the arms are in their operating position, said safety device comprising roller means (20) movably secured to said carriage and located ahead of said arms, as viewed in the inserting direction, said safety device further comprising safety catch means (42) normally engaging said arresting means (30, 32), and means (50, 51, 52) operatively connecting said safety catch means (42) to said roller means for disengaging said safety catch means from said arresting means only if said roller means rest on a support.

2. The mechanism of claim 1, wherein said connecting means further comprise lever means (52) movably and rotatably securing said roller means (20) to said carriage for upward tilting when said roller means contact a support under load, said safety catch means comprising a safety bolt, said connecting means connecting said safety bolt to said lever means whereby the safety bolt disengages from said arresting means when said roller means are subjected to said load.

3. The mechanism of claim 1, wherein said lever means constitute a bell-crank having two arms.

4. The mechanism of claim 3, wherein said connecting means comprise cable means operatively interconnecting one of said bell-crank arms with said safety catch means, said other bell-crank arm carrying said roller means.

5. The apparatus of claim 1, further comprising stop means (55, 56) operatively positioned for limiting the excursion of said connecting means.

6. The apparatus of claim 5, wherein said connecting means comprise bell-crank lever means, said stop means including a third arm (55) of said bell-crank lever means and a stationary stop member (56).

* * * * *

UNITED STATES PATENT OFFICE
CERTIFICATE OF CORRECTION

Patent No. 4,275,896            Dated June 30, 1981

Inventor(s) Josef Eicher

It is certified that error appears in the above-identified patent and that said Letters Patent are hereby corrected as shown below:

-- [30]  Foreign Application Priority Data

October 7, 1976 [CH] Switzerland .......... 12738/76 --.

Signed and Sealed this

First Day of September 1981

[SEAL]

Attest:

GERALD J. MOSSINGHOFF

Attesting Officer    Commissioner of Patents and Trademarks